DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JANUARY 6, 1976

942 O.G. 191

T942,009

PHOTOGRAPHIC FILMS

David Roderick Mann, Colchester, Geoffrey Pickles Irvin, Brantham, near Manningtree, and Richard Silverwood, Wivenhoe, England, assignors to Imperial Chemical Industries Limited, London, England

Filed Feb. 7, 1975, Ser. No. 548,219

Claims priority, application Great Britain, Feb. 21, 1974, 7,872/74

**Int. Cl. G03c *1/82***

U.S. Cl. 96—87 R

1 Sheet Drawing. 17 Pages Specification

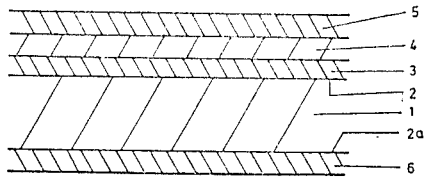

Back coated anti-static photographic films are disclosed comprising a self-supporting synthetic plastics film base having superimposed on one side a radiation-sensitive layer and an anti-static material applied to the other side of the film base, the anti-static material comprising a quaternary ammonium copolymer containing repeating units of the formula:

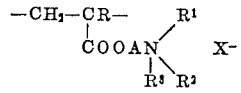

wherein R represents hydrogen or methyl; $R^1$ represents methyl or ethyl; $R^2$ and $R^3$ each independently represent methyl or ethyl, or $R^2$ and $R^3$ taken together represent $—CH_2CH_2OCH_2CH_2—$ or $—(CH_2)_n—$ where $n$ represents 4, 5 or 6; A represents an alkylene or substituted alkylene group; and $X^-$ represents a chloride or acetate ion, and copolymeric units derived from styrene, 2-ethylhexyl acrylate, methyl methacrylate, methyl acrylate, ethyl acrylate, butyl acrylate, ethylhexyl acrylate, acrylonitrile, vinyl toluene, vinyl acetate, β-ethoxyethyl methacrylate, β-hydroxyethyl methacrylate, ethylene glycol dimethacrylate, acrylamide, diacetone acrylamide, ethylene, propylene or divenyl benzene, the copolymer having an average molecular weight in the range 5,000 to 2,000,000. Illustrated are copolymers of trimethyl-β-methacryloyloxyethyl ammonium chloride with styrene; ethyldimethyl methacryloxyethyl ammonium bromide with methyl methacrylate; and ethyldimethyl methacryloyloxyethyl ammonium acetate with styrene. The film base may comprise an oriented polyester film, such as polyethylene terephthalate.

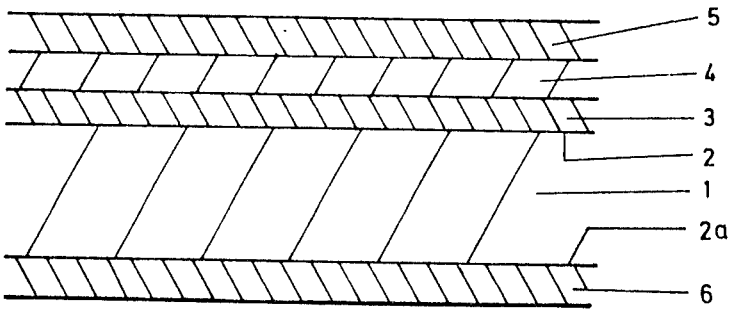

PHOTOGRAPHIC FILMS
Original Filed Feb. 7, 1975